United States Patent [19]
Goble

[11] 4,147,968
[45] Apr. 3, 1979

[54] STEPPER MOTOR CONTROL

[75] Inventor: William M. Goble, Perkasie, Pa.

[73] Assignee: Moore Products Co., Spring House, Pa.

[21] Appl. No.: 836,662

[22] Filed: Sep. 26, 1977

[51] Int. Cl.² ............................................. G05B 11/26
[52] U.S. Cl. .................... 318/685; 318/696
[58] Field of Search .............. 318/685, 696, 563, 663, 318/678, 138, 254

[56] References Cited

U.S. PATENT DOCUMENTS

| | | | |
|---|---|---|---|
| 3,486,091 | 12/1969 | Siess | 318/138 |
| 3,619,757 | 11/1971 | Ioergei et al. | 318/138 |
| 3,755,726 | 8/1973 | Knipe et al. | 318/685 |
| 4,031,447 | 6/1977 | Togo et al. | 318/685 |

Primary Examiner—Gene Z. Rubinson
Attorney, Agent, or Firm—Zachary T. Wobensmith, 2nd; Zachary T. Wobensmith, III

[57] ABSTRACT

A stepper motor control system is described for positioning a mechanical element connected to a stepper motor which includes an electric analog signal producing system connected to a stepper motor with a variable speed mode of driving the motor and which includes a power saver circuit for electrical de-energization of the motor when not in use.

1 Claim, 1 Drawing Figure

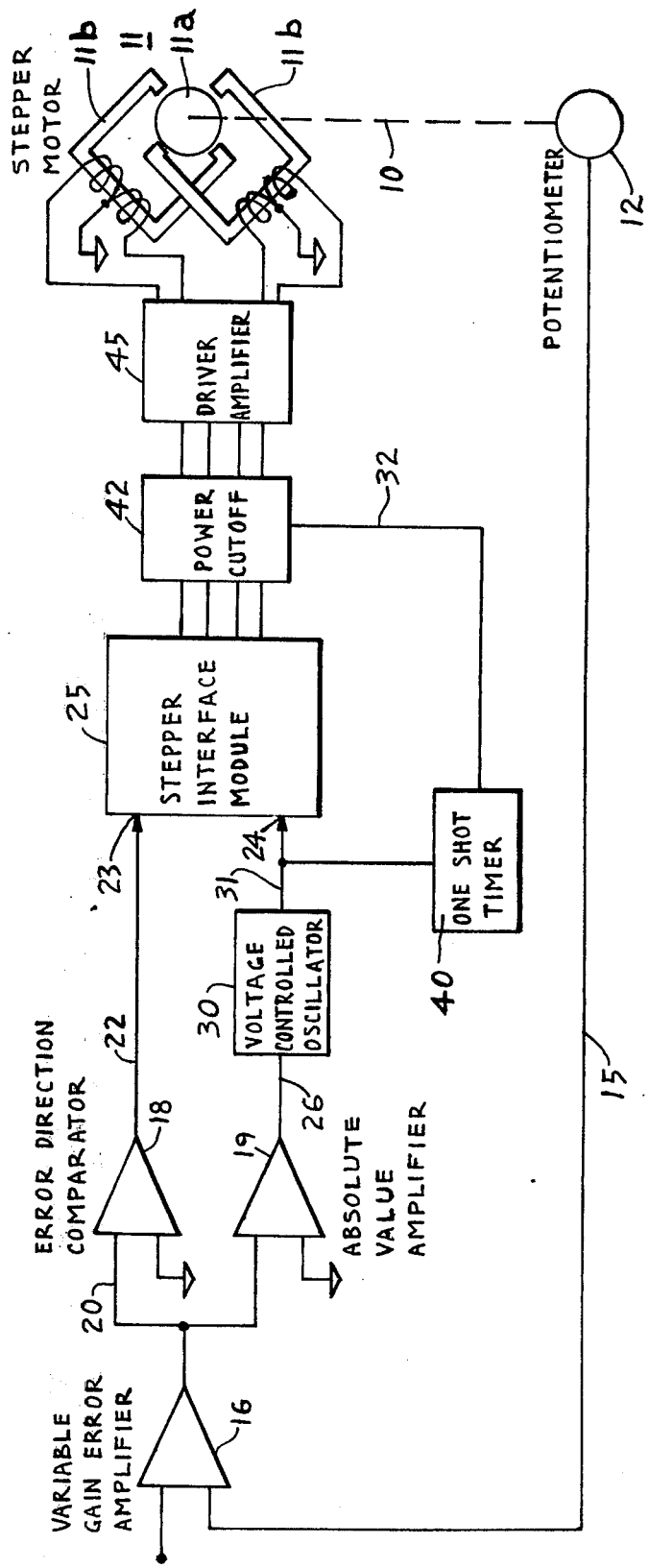

STEPPER MOTOR CONTROL

BACKGROUND OF THE INVENTION

1. Field of the Invention

This invention relates to a control system for a stepper motor of the type which utilizes an analog signal to initiate rotation of the motor with the motor de-energized between moves.

2. Description of the Prior Art

Servo systems for positioning a mechanical element in proportion to an analog signal have been used in prior art but these have employed direct current motors instead of a stepper motor such as is employed in my invention.

A stepper motor typically has permanently magnetized poles arranged around the periphery of its rotor and a plurality of phase windings on its stator. The rotor advances from one pole to the next on each pulse which selectively energizes the stator windings.

Direct current motors have been proposed for positioning a mechanical element and usually employ a wound rotor connected to the driving source through a commutator, the stator providing a fixed magnetic field either through the use of permanent magnets or through electro-magnetic action.

Direct current motors have certain disadvantages in that they are larger than stepper motors for the same torque output, power must be applied to a direct current motor to lock the stator, and it is often difficult to precisely control the direct current motor rotation.

SUMMARY OF THE INVENTION

In accordance with the invention, a motor control system is provided for positioning a mechanical element in proportion to an electric analog signal, which utilizes a stepper motor having a variable speed mode of drive, and a power saver circuit which deenergizes the motor completely when it is not required to move.

The principal object of the present invention is to provide a stepper motor control system wherein the rotor is locked in deenergized condition.

A further object of the invention is to provide a system of the character aforesaid which provides a digital stepping action.

A further object of the invention is to provide a system of the character aforesaid which is of compact lightweight design.

A further object of the invention is to provide a system of the character aforesaid which is simple and inexpensive to construct but sturdy and reliable in operation.

Other objects and advantageous features of the invention will be apparent from the description and claims.

DESCRIPTION OF THE DRAWING

The nature and characteristic features of the invention will be more readily understood from the following description taken in connection with the accompanying drawing forming part hereof, in which:

The FIGURE is a diagramatic view of a stepper motor employing the control system of my invention.

It should, of course, be understood that the description and drawing herein are illustrative merely and that various modifications and changes can be made in the structure disclosed without departing from the spirit of the invention.

DESCRIPTION OF THE PREFERRED EMBODIMENT

Referring now to the drawing, it should be noted that the circuit, power supplies, ground connections, current-limiting resistors, and other such details are omitted since such elements are well known by those skilled in the art. The dashed line 10 indicates a mechanical connection between a stepper motor 11 and a feedback element 12 which may conveniently be a rotary slide wire potentiometer 12 connected to a suitable voltage source so that it provides an output electric voltage which is proportional to its mechanical position. The stepper motor 11 has a rotor 11a and coils 11b. The rotor 11a has permanently magnetized poles (not shown) around its periphery. An electric analog signal which if not already in the form of a voltage may be converted by conventional means is supplied to one input terminal of a differential amplifier or comparator 16.

The electric signal from the potentiometer 12 through wire 15 is connected to the other input terminal of the amplifier 16 where it is compared to the electric analog signal connected to the other input terminal of the amplifier 16. The comparator 16, for this operation, is a variable gain amplifier which conveniently may have an output voltage which is greater or less than zero by an amount which is proportional to the difference between the input analog voltage and the feedback voltage from the potentiometer 12.

The output from the comparator 16 is then simultaneously directed to two additional comparators 18 and 19 by wire 20. The first comparator 18, an error direction comparator, compares its input to zero and provides an output which is either high or low, depending on whether the input is above or below zero. The second comparator 19 is an absolute value amplifier which provides an output signal which is proportional to the absolute value of the difference between its input and zero.

The output from the error direction comparator 18 is fed through wire 22 to the first of two inputs 23 and 24 of a conventional stepper interface module 25 which is connected through a power cut off 42 to a driver amplifier 45 which is connected to motor 11. The stepper interface module 25 provides the necessary logic elements so that the rotor 11a of motor 11 will rotate in one direction if this input is high, and in the opposite direction if this input is low. The motor rotor 11a advances one pole space on the rotor 11a for each pulse supplied to the second of the two input terminals. To control the rate at which pulses are supplied to said second input terminal 24, the output of the absolute value amplifier 19 through conductor 26 is used to control the frequency of a voltage controlled oscillator 30 whose output is connected by conductor 31 to the second input terminal 24. Thus, when there is a large error in either direction between the input analog voltage and the feedback voltage, a relatively high frequency will be generated by the voltage controlled oscillator 30 and the motor 11 will be driven at relatively high speed, and for zero error between these two voltages and the frequency of the oscillator 30 will be very low so that the motor 11 advances one step, first in one direction and then the other with a period that may be in the order of several seconds.

In a typical application for this circuit, for example, in driving the pen carriage of an analog recorder (not shown), the stepper motor 11 is typically in its null or balance condition most of the time. Because the stepper motor 11 employs a permanent magnet structure in the rotor line 11a, it will remain at rest without the application of external power even though substantial external torque from the driven device may be present.

In order to avoid unnecessary power consumption with resulting undesirable heating effects in the steady state condition, a power saver circuit has been provided. This utilizes a one-shot timer module 40 connected to conductor 31 which provides a short pulse from its output each time its input is energized. The output pulse is connected by conductor 32 to the input terminal of a power cut off unit 42 which is connected to the motor 11 through the driver amplifier 45.

The power cut off unit 42 will allow signals from the interface module 25 to pass through it only for the duration of this pulse.

The length of the pulse is just sufficient to provide the energy for one step of the stepper motor 11, which in a typical situation may be in the order of 22 milliseconds. Thus, during the quiescent or balanced state, motor power consumption is several orders of magnitude less than during full speed operation.

The output signal from the stepper interface module 25 is typically at a low level of voltage. In order to obtain the power required to operate the motor, the driver amplifier 45 is interposed between the interface module 25 and the motor 11, and its function is simply to amplify the logic signals coming from the stepper interface module 25 and to transmit them in amplified form to the stepper motor 11.

It will thus be seen that apparatus has been provided with which the objects of the invention are achieved.

I claim:

1. In a stepper motor control system for moving an output member to a position proportional to an electric analog input signal
an analog voltage generating member responsive to said position for generating an electric analog feedback signal proportional to said position,
motor means,
control means for supplying a control voltage for actuation of said motor means,
said control means including members responsive to the difference between said input and feedback signals for delivering a control voltage proportional to the magnitude and direction of said difference,
said motor means comprising a rotor element having permanently magnetized poles around its periphery and a stator element having a plurality of phase windings arranged to advance said rotor element one pole space each time said windings are selectively energized.
said control means also including converting means responsive to said control voltage for generating electric pulses for energizing said stator windings,
said converting means comprising an error direction comparator for delivering a logic signal for one polarity of said voltage and a different logic signal for the opposite polarity of said voltage,
an absolute value amplifier for delivering a regulating voltage proportional to the absolute value of said control voltage,
a voltage controlled oscillator responsive to said regulating voltage for generating pulses at a frequency directly related to said regulating voltage,
interface means responsive to said logic signals and to said pulses for establishing a sequence of pulses for controlling the operation of said motor,
amplifying means for said sequential pulses for energizing said windings,
power cut-off means interposed between said interface means and said amplifier means, and
a one shot timer module receiving pulses from said voltage controlled oscillator and providing output pulses of limited duration for controlling said power cut-off means.

* * * * *